(12) United States Patent
Sheeran

(10) Patent No.: US 6,909,726 B1
(45) Date of Patent: Jun. 21, 2005

(54) ADAPTIVE BANDWIDTH SYSTEM AND METHOD FOR BROADCAST DATA

(75) Inventor: Daniel Sheeran, Louisville, CO (US)

(73) Assignee: Broadband Royalty Corporation, Wilmington, DE (US)

(*) Notice: Subject to any disclaimer, the term of this patent is extended or adjusted under 35 U.S.C. 154(b) by 894 days.

(21) Appl. No.: 09/699,236

(22) Filed: Oct. 27, 2000

Related U.S. Application Data

(60) Provisional application No. 60/163,046, filed on Oct. 28, 1999.

(51) Int. Cl.[7] .................................................. H04J 3/16
(52) U.S. Cl. ................... 370/468; 370/395.41; 370/477
(58) Field of Search ........................... 370/352, 395.21, 370/395.41, 395.43, 437, 465, 468, 477, 532, 537, 538, 540, 329, 341, 395.4

(56) References Cited

U.S. PATENT DOCUMENTS

| | | | |
|---|---|---|---|
| 4,933,935 A | | 6/1990 | Adams ....................... 370/85.7 |
| 5,446,919 A | | 8/1995 | Wilkins |
| 5,461,619 A | | 10/1995 | Citta et al. |
| 5,675,732 A | | 10/1997 | Majeti et al. |
| 5,745,837 A | | 4/1998 | Fuhrmann ................... 455/5.1 |
| 5,822,324 A | | 10/1998 | Kostresti |
| 5,861,919 A | | 1/1999 | Perkins et al. .............. 348/385 |
| 5,880,864 A | * | 3/1999 | Williams et al. .............. 398/71 |
| 5,940,738 A | | 8/1999 | Rao |
| RE36,801 E | | 8/2000 | Logan et al. |
| 6,104,700 A | * | 8/2000 | Haddock et al. ............ 370/235 |
| 6,381,244 B1 | * | 4/2002 | Nishimura et al. ..... 370/395.21 |
| 6,574,193 B1 | * | 6/2003 | Kinrot ......................... 370/229 |
| 6,658,010 B1 | * | 12/2003 | Enns et al. .................. 370/401 |

FOREIGN PATENT DOCUMENTS

| | | |
|---|---|---|
| EP | 0713347 A2 | 5/1996 |
| WO | WO-99/09741 A1 | 2/1999 |
| WO | WO-99/16247 A1 | 4/1999 |

\* cited by examiner

*Primary Examiner*—Phirin Sam
(74) *Attorney, Agent, or Firm*—Oblon, Spivak, McClelland, Maier & Neustadt, P.C.

(57) ABSTRACT

A system and method for optimizing bandwidth efficiencies in the distribution of digital video, digital audio and data over a cable television system is provided. In accordance with the invention, different transmission channels or portions thereof can be dynamically customized to contain only those digital video, digital audio and data components of value at that time to the customers served by those channels. This customization requires a dynamic bandwidth management component which has the ability to monitor and react to changing customer usage patterns and to instruct a re-multiplexor to allocate bandwidth from digital services that require less bandwidth at a given time to services that require more bandwidth.

56 Claims, 2 Drawing Sheets

ADAPTIVE BANDWIDTH SYSTEM AND METHOD FOR BROADCAST DATA

This application claims benefit of application Ser. No. 60/163,046 filed Oct. 28, 1999.

BACKGROUND OF THE INVENTION

This invention relates generally to a system and method for providing an adaptive bandwidth system and method for a broadcast system and in particular, to a system and method for allocating bandwidth over a broadcast type system in response to downstream end user behavior.

Typical broadcast type systems, such as television systems and cable systems, broadcast the same signal to all service nodes and/or subscribers. These typical systems are known as broadcast systems because a single identical signal is transmitted at all times regardless of whether it is being used by any end user. It is desirable for broadcast systems, such as cable television systems, to be able to have a digital packet switched system so that system bandwidth is only used for services actually being used by end users.

There are various different systems that attempt to provide some features of a switched system to broadcast systems. For example, one patent, assigned to Stanford University, describes a method of tracking and targeting a demographically-defined audience in a cable system in which one or more different channels containing advertisements permit advertisements to be targeted to a particular group of customers. The patent does not describe, however, a digital data switched system for a broadcast system. Another patent, assigned to Zenith, discloses a method for multiplexing compressed video and auxiliary data on the same TV transmission system. The system includes a feedback mechanism that allows the multiplexor to the buffering rates of the components of the signal in order to maintain certain quality levels. Again, this system is not a digital data switched network. Yet another patent, assigned to Lucent, describes a method for multiplexing data services across multiple TV transmission channels. In this method, the maximum data levels are fixed on each channel but a bandwidth manager dynamically tracks bandwidth usage on the channels and has the ability to determine on which channel(s) any additional traffic will be located.

A digital data switched network may provide a broadcast system with many advantages and capabilities not now available with a broadcast system. For example, the signals, including both programming signals and advertisements, being sent to each subscriber or service node may be more specifically targeted to each subscriber or service node. In addition, the bandwidth being allocated to any single service may be increased, decreased or reduced to zero for some period of time. The digital switched system also permits individual multiplexes of signals to be sent to each service node. Thus, it is desirable to provide a digital data switched network for typical broadcast systems and it is to this end that the present invention is directed.

SUMMARY OF THE INVENTION

A bandwidth adaptive system and method for a broadcast data system is provided. The system permits a broadcast system, such as cable, to vary the bandwidth of any service being provided to a service node or a subscriber based on feedback from the service node or subscriber. The system may also permit a particular service to be dropped for some predetermined period of time so that that bandwidth may be used for other service. In general, the system permits a typical digital broadcast television type system, such as cable, to be converted into a digital data switched network system.

In more detail, the system may include a re-multiplexor that re-apportions the bandwidth of the system based on feedback from the downstream subscribers or service nodes. The feedback from the subscribers or service nodes may be generated based on the downstream end user behavior. For example, if all of the subscribers to a particular service node are not currently using a particular service, the bandwidth allocated to that unused service for the particular service node may be reduced and then the freed up bandwidth may be apportioned to other services. The system also permits a service to be added or dropped with minimal latency and for different multiplexes of signals to be generated for each service node depending on the current needs of the service node. To drop/add a service, the system may use a novel ring buffer mechanism as will be described below in more detail.

In accordance with one aspect of the invention, a method for optimizing bandwidth efficiencies in the distribution of digital video, digital audio and data over a cable television system is provided. In particular, different transmission channels or portions thereof can be dynamically customized to contain only those digital video, digital audio and data components of value at that time to the customers served by those channels. This customization may be accomplished with a dynamic bandwidth management component/mechanism that has the ability to monitor and react to changing customer usage patterns, and to instruct a re-multiplexor module to allocate bandwidth from digital services that require less bandwidth at a given time to services that require more bandwidth. One or more different flow control mechanism in accordance with the invention to achieve this goal are described below. In addition, the bandwidth efficiencies described herein may be obtained without causing a degradation of service to the customers of the system through a variety of techniques described herein. The system described herein requires the creation and distribution of unique multiplexes for each digital carrier channel in each optical node in a cable television system.

In accordance with another aspect of the invention, the system may include a data receiver that receives digital broadcast television data, such as the data needed for the CNN or EPSN television services, and IP data, and a bandwidth allocation and multiplexing system that dynamically allocates the bandwidth in the system to one or more services nodes. The dynamic allocation may occur based on feedback about subscriber behavior that is fed into the bandwidth allocation and multiplexing system. In more detail, the bandwidth allocation and multiplexing system may include a re-multiplexor, a bandwidth manager and a digital broadcast television services server connected together. The server receives the feedback about the subscriber's behavior and forwards it onto the bandwidth manager. Based on the subscriber behavior, the bandwidth manger may determine how to allocate the bandwidth of the system. The re-multiplexor may allocate the system bandwidth based on the commands from the bandwidth manager. Using this system, a switched digital data network for broadcast type data is provided

DETAILED DESCRIPTION OF A PREFERRED EMBODIMENT

The invention is particularly applicable to dynamic bandwidth allocation based on subscriber behavior in a digital broadcast television cable system and it is in this context that the invention will be described. It will be appreciated, however, that the system and method in accordance with the invention has greater utility, such as to other types of broadcast systems in which dynamic bandwidth allocation is desirable. In the preferred embodiment, the invention may be implemented by one or more pieces of hardware, such as the servers, the re-multiplexor and the service nodes, and one or more pieces of software, such as the bandwidth manager and software in the service nodes and the re-multiplexor, that are executed by the one or more pieces of hardware. Together, the hardware and software implement the bandwidth allocation system. Now, the bandwidth allocation system for broadcast data in accordance with the invention will be described in more detail.

Figure 1:
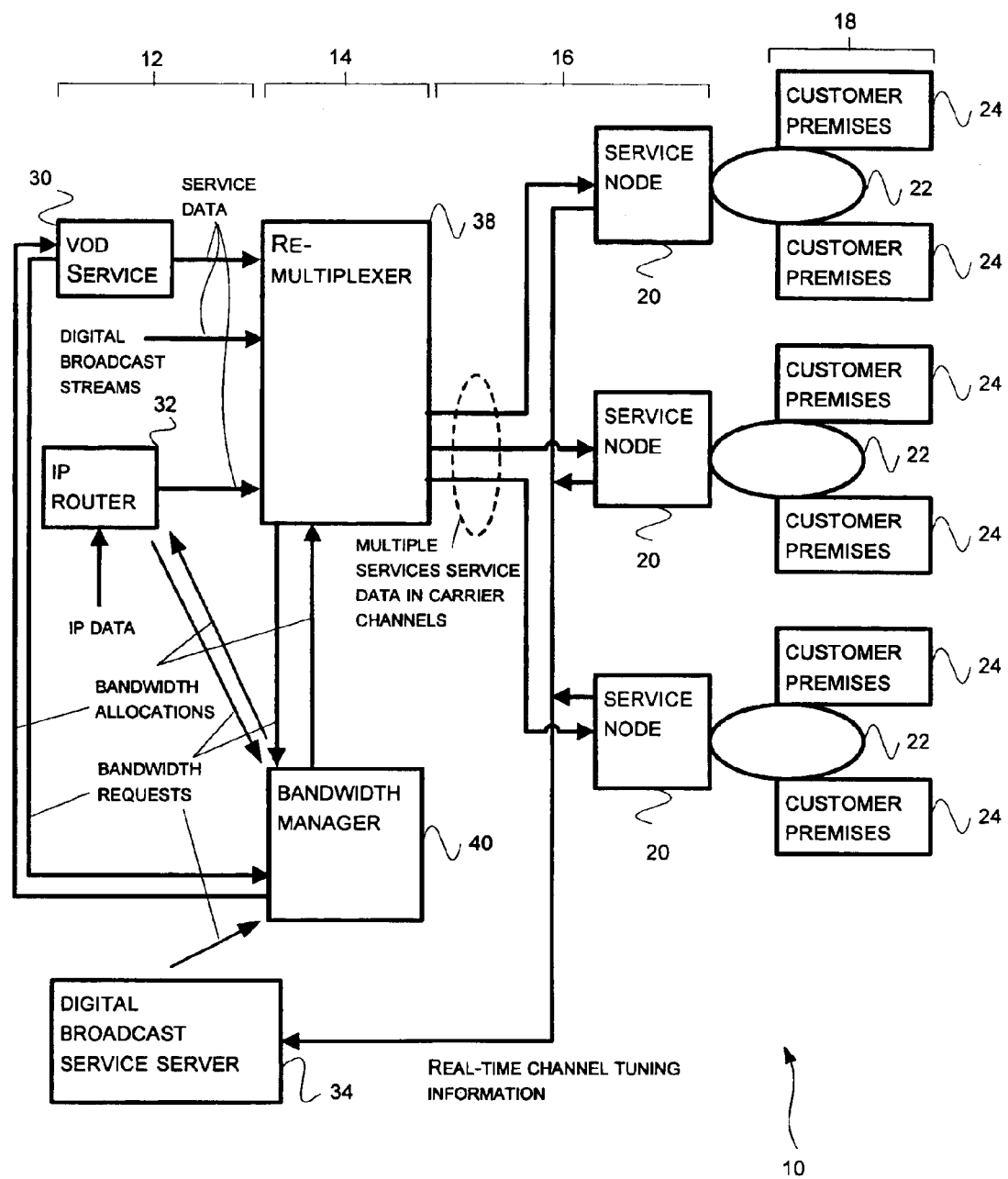
FIG. 1 is a block diagram illustrating a broadcast system incorporating the bandwidth allocation system in accordance with the invention.

FIG. 1 is a block diagram illustrating a broadcast system 10 incorporating the bandwidth allocation system in accordance with the invention. In this example, a cable television transmission system is shown that may use frequency division multiplexing techniques to distribute data ("Service Data") for various digital video, digital audio and data services (the "Customer Services") over multiple carrier channels to customers of the system. The system may use various multiplexing techniques to distribute multiple Customer Services within each carrier channel. Digital video Customer Services may include digital broadcast television services, such as a cable television network, or targeted services, such as video-on-demand may be either constant bit rate (CBR) or variable bit rate (VBR) video streams, and may be sent encrypted or unencrypted. Each discrete digital video program, including all of its audio, video and associated data, is to be considered a single Customer Service. The Transmission System includes Service Nodes 20 from which a common set of carrier channels is sent to all customers served by that Node, with each customer tuning to the carrier channel and data streams within that channel needed to receive a particular Customer Service.

In more detail, the system 10 may include a service server portion 12, a bandwidth allocation and multiplexing system 14, a transmission system 16 and one or more consumer premises equipment (CPEs) 18. In operation, the service servers may receive incoming data to be transmitted via the broadcast system and receive feedback about the subscriber behavior that is used to control the bandwidth allocation, the bandwidth allocation and multiplexing system 14 may dynamically allocate bandwidth based on the subscriber behavior and generate a possible unique multiplex of signals for each service node, the transmission system may connect the service servers and bandwidth allocation and multiplexing systems to the CPEs and communicate the multiplexes to each service node and the CPEs may communicate the signals to the individual subscribers. In a preferred embodiment, the transmission system 16 may be a terrestrial cable, a fiber optical cable, a wireless cable or a satellite system and the CPEs may be optical equipment or electrical equipment. Each CPE 18 may include a service node 20, that may be an optical node in a preferred embodiment, and a coaxial cable 22 served by that optical node with the coaxial cable connecting one or more customers 24 and the service node together. The service node 20 may receive a multiplex of signals from the system 10 and then distribute the services to each household. The service node may also generate information about subscriber behavior, such as real-time channel tuning information, that may be used by the bandwidth allocation and multiplexing system to allocate the bandwidth among the Customer Services.

The service servers 12 for each Customer Service may include a video on demand (VOD) service server 30, an IP data router 32 and a digital broadcast television service server 34. The VOD service server 30 may generate VOD service data that is passed on to a re-multiplexor 38 of the bandwidth allocation and multiplexing system 14 based on the bandwidth allocated to the VOD service, may generate bandwidth requests that are passed onto a bandwidth manager 40 and may receive a bandwidth allocation response from the bandwidth manager. The IP router 32 may receive IP data to be communicated over the system 10, may generate IP service data for retransmission by the re-multiplexor 38 based on the bandwidth allocated to the IP service, may generate bandwidth requests to be sent to the bandwidth manager 40 and may receive bandwidth allocation responses from the bandwidth manager. In addition to the VOD and IP data, the re-multiplexor may also receive digital broadcast television streams. The digital broadcast television service server 34 may receive subscriber behavior feedback, such as optional real-time channel tuning information, from each service node 20 over the transmission system 16. The subscriber behavior data may be processed to generate information about the current bandwidth demands of each service node 20 and then may be forwarded onto the bandwidth manager 40 that may use the feedback to dynamically allocate the bandwidth of the system between the various services.

The bandwidth allocation and multiplexing system 14 may include the re-multiplexor 38 and the bandwidth manager 40. The bandwidth manager 40 may dynamically allocate, in real-time, the bandwidth of the system to the various services based on the feedback data and the bandwidth requests from the service servers and then issue bandwidth instructions to the re-multiplexor. The re-multiplexor 38 may, based on the instructions from the bandwidth manager, generate a multiplex of signals for each service node 20. For example, if one service is being dropped for a predetermined period of time from a particular service node, then that service node's multiplex of signals will not include the dropped service. The capability for the re-multiplexor to ensure that all of the Bandwidth Services allocated to the Customer Services are provided to the Services through a variety of techniques, including dropping data packets and various statistical multiplexing techniques.

The Bandwidth Manager 40 can dynamically track the requests of the Customer Services for Bandwidth Services on the Transmission System and can dynamically allocate Bandwidth Services among and within carrier channels to each Customer Service based on the requests specified by the Customer Service and based on a rules-based Bandwidth Manager Decision Tree. The Bandwidth Manager Decision Tree will implement rules such as:

1) Reserve bandwidth for a particular Customer Service permanently;
2) Reserve bandwidth for a particular Customer Service for a specific period of time;
3) Reserve bandwidth for a particular Customer Service until the set-top box requesting the bandwidth is turned off;

4) Reduce bandwidth for IP Customer Services if any Digital Video Services, such as VOD or Digital Broadcast Services, request use of the bandwidth;

5) Apply a rating system to each type of Customer Service, and allocate bandwidth according to the rating's system, such that any Service with a higher rating receives requested bandwidth if no other Service with a higher rating has requested the bandwidth for the same time slot.

Bandwidth Services may also be specified to include a maximum and/or average bit rate. The Decision Tree may also include a rule that if no customer served by a particular service node ("optical node") is tuned to a particular digital video Customer Service, such as digital cable television networks, then that Customer Service may be significantly degraded—or even temporarily removed from the data multiplex sent through that channel—in order to reduce the amount of bandwidth consumed by that Customer Service.

In more detail, the Bandwidth Manager 40 is responsible for providing the Service Servers 12 with information about which carrier channels can reach each Service node. The Bandwidth Manager also provides the Service Servers various bandwidth parameters for each channel, such as the maximum average bit rate that can be guaranteed to the Customer Service and the duration over which the bandwidth guarantee can be provided. The carrier channel information and these parameters define the Bandwidth Services available.

To obtain some bandwidth for some period of time, each Service Server may make a request for Bandwidth to the bandwidth manager. The bandwidth manager then sends an acceptance or denial message to Server's request. If the request is accepted, the Bandwidth Manager also sends a notice to the Re-Multiplexor, with descriptors about the Bandwidth Services allocated to the particular Customer Service. The Re-Multiplexor uses these descriptors and a rules-based Re-Multiplexor Decision Tree to provide Bandwidth Services to all of the Customer Services in each multiplex.

Any Customer Service may be either a unicast mode or a multi-cast mode from the Re-multiplexor. Under a unicast mode, a single stream of data packets containing the Customer Service Data for a particular Customer Service is input into the Re-Multiplexor and is then multiplexed onto a single outbound carrier channel to a particular Service Node 20. Under a multi-cast mode, a single stream of data packets containing the Service Data for a particular Customer Service is input into the Re-Multiplexor, and is then multiplexed onto more than one outbound carrier channels. For example, a single stream of data for a digital cable television program could be input into the Re-multiplexor, and then multiplexed onto one carrier channel for every Customer Service Node 20 served by that Re-Multiplexor.

The carrier channel of the system may use different compression protocols and modulation schemes. In a preferred embodiment, a Multi-Program Transport Stream as defined by the MPEG-2 Transport Stream protocol may be used and each carrier channel may be modulated for transmission using Quadrature Amplitude Modulation (QAM). The Customer Services provided using the system may include Internet Protocol (IP) packets being delivered to subscriber's cable modems compliant with the MCNS/DOCSIS or DVB-DAVIC cable modem standards, and the IP router 32 may include a Cable Modem Termination System compliant with these standards. Now, a technique for providing a quality of service (QoS) capability in the broadcast system will be described in more detail.

The system 10 shown in FIG. 1 may be further enhanced by providing additional Quality-of-Service (QoS) capabilities in the Bandwidth Services through the following techniques employed by the Bandwidth Manager that will be described with reference to FIGS. 2 and 3. In particular, a minimum level of bandwidth (a "Floor Level") may be permanently reserved, or reserved for a specified period of time, within each carrier channel for Customer Services of a specified type, such as Internet Protocol (IP) Customer Services, Digital broadcast television Services, or for Customer Service of a certain designation, such as Customer Services flagged as requiring QoS.

Using the Bandwidth Manager Decision Tree, the Bandwidth Manager may allocate bandwidth to Customer Services not protected by a Floor Level in a manner that ensures the aggregate bandwidth they consume does not exceed the amount equal to the total bandwidth available on the carrier channel minus the Floor Level, and if needed, the Re-multiplexor may employ a variety of digital bit rate reduction techniques to enforce this policy.

Figure 2:
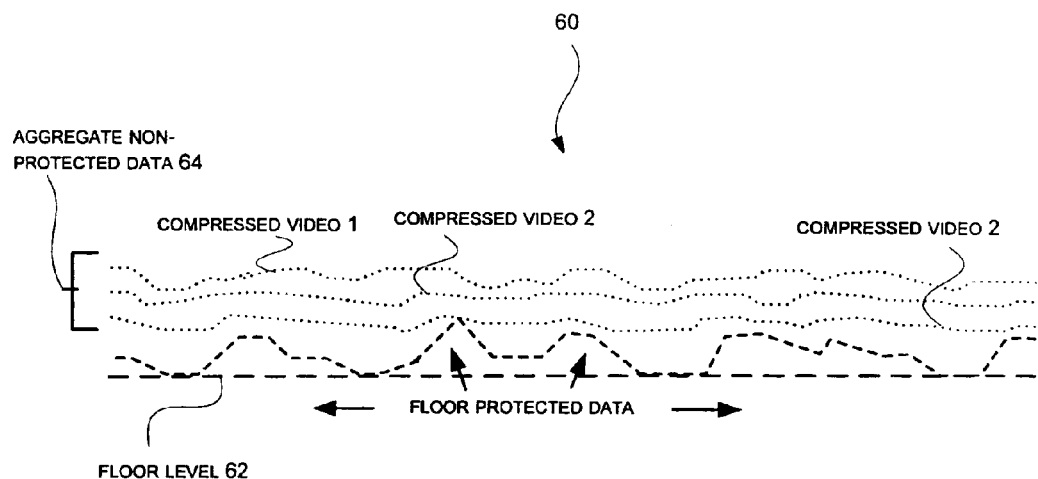
FIG. 2 is a diagram illustrating an embodiment of the bandwidth allocation method in accordance with the invention.

FIG. 2 illustrates an example of a carrier channel 60 that may include a first service floor level channel 62 so that the data for that service is guaranteed that bandwidth regardless of what happens to the rest of the carrier channel. Thus, the rest of the channel 64 may transmit aggregate non-protected data of various kinds (e.g., compressed video 1, compressed video 2 and compressed video 3 in this example) in the unprotected channel 64. In the example shown in FIG. 2, the floor protected service exceeds the floor level several times, but it is always guaranteed at least the floor level of bandwidth. The bandwidth requirements of the aggregated unprotected data channel 64 may fluctuate for several reasons. First, the Customer Services that make up the data in the unprotected channel may be composed of variable bit rate digital video streams resulting in varying bandwidth requirements. Second, one or more data streams in the unprotected channel 64 may be degraded by the re-multiplexor based on bandwidth manager commands if no subscribers are currently using the particular Customer Service.

Figure 3:
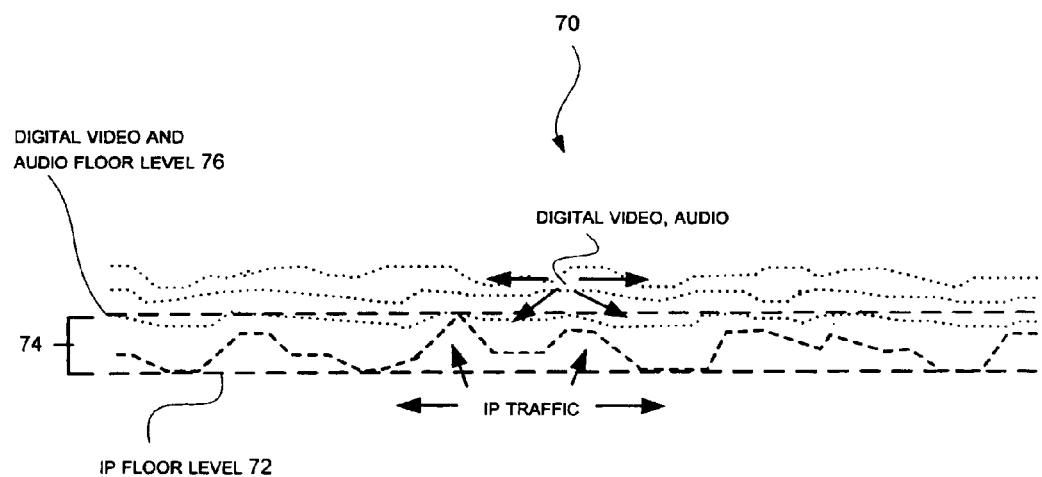
FIG. 3 is a diagram illustrating another embodiment of the bandwidth allocation method in accordance with the invention.

FIG. 3 illustrates an example of a carrier channel 70 that may include a first floor level 72 (for IP data in this example), a second floor level 76 (for digital video and audio in this example) and an unprotected channel 74 that is available to the Customer Services carried in both the first floor level 72 and the second floor level 76. Thus, in accordance with the invention, one or more additional Floor Levels may be created and administered by the Bandwidth Manager within a given carrier channel Through the use of a configuration tool in the bandwidth manager, the one or more Floor Level(s) may be configured to rise or fall to different levels based on time-of-day, past or current usage levels.

In accordance with the invention, the system may provide Quality-of-Service (QoS) to digital video Customer Services that have been degraded or eliminated from a multiplex when no customer CPE is tuned to that Customer Service using various techniques employed by the Bandwidth Manager. These techniques include: 1) The Ring Buffer; 2) The I-Frame Carousel; 3) The Floor Level Protection System; and 4) Headend-Based MPEG Splicing.

Ring Buffer Technique. In particular, for MPEG-2 digital broadcast television Customer Services that have been eliminated entirely from the multiplex, a Ring Buffer of that Customer Service's data in the Re-multiplexor is created.

In more detail, the Ring Buffer is a continuous stream of all of the data needed by a real time digital video Customer Service, with the data being stored in the Re-Multiplexor's random access memory (RAM), which is the physical host of the buffer. The digital video data of this stored stream is composed of a single "Group of Pictures" (GOP) as defined by the MPEG-2 specification. Each GOP begins with an "I frame". In order to maintain the current data for the real time stream in the buffer, the stored GOP is deleted and replaced by the I frame for the next GOP as soon as that I frame has entered the Re-Multiplexor. The Re-Multiplexor continues to fill the Ring Buffer with other frames in that GOP as they are received by the Re-Multiplexor, until the entire GOP is replaced by the next I frame. The buffer is thus composed at any given time by either a partial or whole GOP.

The Dynamic Bandwidth Manger may then either maintain this Ring Buffer for each digital broadcast television Customer Service at all times, or create and maintain it only at the time it determines that no customer CPE devices are tuned to that Customer Service. When the Bandwidth Manager determines that a customer CPE device has tuned to a digital broadcast television Customer Service that has been eliminated from its transmission multiplex, it locates the partial or whole GOP in the buffer, adds it to the multiplex, and then includes all subsequent GOPs for that Customer Service in the multiplex as long as at least one customer CPE remains tuned to the Customer Service. This approach minimizes the delay or "latency" experienced by customers who tune to a Customer Service not currently included in their transmission multiplex because of the nature of the MPEG-2 compression standard. According to this standard, the receiver device, i.e., the MPEG-2 decoder, can only begin decoding a stream using an I frame. Other frame types within a GOP, such a B and P frames, cannot be used to begin the decoding process. Therefore, if, at the time a decoder attempts to begin decoding a stream, the first frame it receives is not an I frame, it must wait until receiving the I frame before beginning to decode the video. Most of the MPEG-2 encoders now in use generate only one I-frame every 0.5 seconds. Therefore, without use of the Ring Buffer as described herein, a decoder attempting to decoder an MPEG-2 video stream that has been added to a multiplex might need to wait up to 0.5 seconds after it has found the stream before the decoding could commence. The Ring Buffer eliminates this delay since it supplies the MPEG-2 decoder with the I-frame immediately. This approach will be feasible in situations where the return path latency from the customer CPE to the Bandwidth Manager is relatively low. In such situations, the message to add the Customer Service back into its multiplex will be received quickly enough to enable an acceptable total delay between the time the Customer Service is requested and the time it is presented on-screen.

I-Frame Carousel. For an MPEG-2 digital broadcast television Customer Service that has been degraded but not eliminated entirely from the multiplex, the Bandwidth Manager can ensure that sufficient data is retained in the multiplex at all times to make it possible to rapidly deliver at least the first video frame as a "still frame" if a customer tunes to the Customer Service. The MPEG-2 decoder in the customer CPE can maintain the still frame on the television screen while the necessary additional data is added to the multiplex to deliver the full video service. If the Transmission System is employing the MPEG-2 video encoding standard, this technique described immediately above can be accomplished by including at least one I frame per second for each digital video stream in every carrier channel multiplex. This approach will be feasible in situations where the return path latency from the customer CPE to the Bandwidth Manager is relatively high. In such situations, the still frame indicates that the requested digital video Customer Service will soon be available.

The Floor Level Protection System. The system in accordance with the invention may be further enhanced to allow the digital video, digital audio and data Customer Services delivered by the Transmission System to be allocated among the carrier channels in a manner that enables the Floor Level (See FIGS. 2 and 3) to be maintained with a minimal impact on the QoS of the other Customer Services not protected by the floor level. This can be achieved by allocating the digital video and digital audio Customer Services not protected by the Floor Level to the various carrier channels in a manner that ensures their average aggregate bit rate within each channel does not exceed the total bandwidth capacity of the channel minus the Floor Level (e.g., to ensure that the digital video and digital audio has sufficient bandwidth even though it is not protected).

CPE-Specific PMTs and Unicast Delivery. In a typical MPEG-2 digital video system, each Multiple Program Transport Stream (MPTS) multiplex contains multiple program streams, and all such streams area available to all CPE authorized to receive them. The multiplexer communicates the identity and constituent elementary components of these streams through the use of MPEG-2 tables called PATs and PMTs. The multiplexer creates the PATs and PMTs for each multiplex, and then inserts them into the MPTS packet stream. The CPE uses the PATs and PMTs and its Virtual Channel, Map (VCM) to locate the data needed for a particular program stream. Typically, when a new program stream is added to a multiplex, or an existing stream is deleted from the multiplex, the multiplexer must create new PATs and PMTs to reflect the new information. The time and need to create new PATs and PMTs can add to the latency experienced by the end-user. The system in accordance with the invention may be enhanced by dedicating a PMT within a given multiplex to a particular CPE rather than to a particular program service. When the CPE requests a new program service, the remultiplexer 38 or digital broadcast television service server 34, replaces the data for the program service then being sent to the CPE with the data for requested program service, including through use of the Ring Buffer technique described herein. The identity number of the program service in the PAT, and the identities of its digital video, digital audio and digital data "elementary streams" do not change, thereby avoiding the latency induced by creating new PATs and PMTs.

While the foregoing has been with reference to a particular embodiment of the invention, it will be appreciated by those skilled in the art that changes in this embodiment may be made without departing from the principles and spirit of the invention as defined by the attached claims.

What is claimed is:

1. A system for dynamically allocating bandwidth between one or more customer services to provide a switched data network for broadcast data, comprising:

one or more different customer service providers that each provide different data to one or more customers;

one or more service nodes wherein each service node provides data to plurality of customer premises and each service node receives a unique multiplex of digital data for its customer premises; and a dynamic bandwidth allocation module to receive customer usage information from the service nodes and determining the bandwidth allocations accordingly and to communicate the bandwidth allocations to the customer service providers.

2. The system of claim 1, wherein the dynamic bandwidth allocation module further comprises a bandwidth manager that receives bandwidth requests from the one or more customer service providers and assigns bandwidth to each of the customer service providers for each service node and a remultiplexer module, based on the bandwidth allocation decisions of the bandwidth manager, that generates the digital data multiplex for each service node based on the bandwidth allocations.

3. The system of claim 2, wherein the customer services comprise one or more of video on demand, IP data and broadcast data.

4. The system of claim 3, wherein each service node further comprises a cable modem termination so that cable modem IP data is included in a multiplex to a service node.

5. The system of claim 2, wherein the bandwidth manager further comprises a decision tree having one or more rules for determining the allocation of the bandwidth for each service node.

6. The system of claim 5, wherein the bandwidth allocation rules further comprise, for each service node, if no customer is using a particular customer service, then degrading the bandwidth allocated to that customer service.

7. The system of claim 1, wherein the bandwidth allocation comprises one or more of permanent bandwidth allocation, period of time bandwidth allocation and as available bandwidth allocation.

8. The system of claim 7, wherein the bandwidth allocation to each customer service further comprises a maximum bitrate and an average bitrate.

9. The system of claim 1, wherein the remultiplexer further comprises means for dropping a customer service provider from the multiplex for a particular service node.

10. The system of claim 9, wherein the dropping means further comprises a ring buffer for adding the dropped customer service back into the multiplex with minimum latency.

11. The system of claim 10, wherein the ring buffer further comprises an MPEG group of pictures containing at least one I-frame so that the customer service is reintroduced into the multiplex with minimal latency.

12. The system of claim 2, wherein the bandwidth manager further comprises means for assigning a quality of service to one or more of the customer services based on the bandwidth requests from the customer service providers.

13. The system of claim 12, wherein the quality of service assigner further comprises means for allocating a minimum guaranteed bandwidth for a particular customer service.

14. The system of claim 12, wherein the quality of service assigner further comprises means for allocating minimum bandwidths simultaneously to multiple customer services.

15. The system of claim 12, wherein the quality of service assigner further comprises means for assigning a variable minimum bandwidth to one or more customer services.

16. The system of claim 15, wherein the variable minimum bandwidth comprises one or more of a time of day adjustable bandwidth allocation and a usage level adjustable bandwidth allocation.

17. The system of claim 12, wherein the quality of service assigner further comprises means for assigning a quality of service to customer services that have been degraded or eliminated from a multiplex.

18. The system of claim 17, wherein the quality of service assigner further comprises a ring buffer for maintaining a continuous loop of data to be able to reinsert the degraded or eliminated customer service with minimal latency.

19. The system of claim 17, wherein the quality of service assigner further comprises a I-frame carousel for maintaining at least an I-frame of the data of the customer service to restart the customer service with minimal latency.

20. The system of claim 2, wherein the remultiplexer further comprises means for assigning a program mapping table to each consumer premises equipment.

21. A method for dynamically allocating bandwidth between one or more customer services to provide a switched data network for broadcast data, comprising: one or more different customer service providers each providing different data to one or more service nodes, the one or more service nodes each providing data to a plurality of customer premises and each service node receiving a multiplex of digital data specifically tailored to its customer;

allocating the bandwidth of the system to the one or more different customer service providers based on the usage of the services by the customers and the bandwidth requests of each service providers wherein the bandwidth assigned to each service node is dynamically adjusted based at least in part on the usage of the services by the customers of the service node.

22. The method of claim 21, wherein the dynamic bandwidth allocation further comprises managing the bandwidth to the one or more customer services with a bandwidth manager that receives bandwidth requests from the one or more customer service providers and assigns bandwidth to each of the customer service providers for each service node and generating multiplexes, based on the bandwidth allocation decisions of the bandwidth manager, that generates the digital data multiplex for each service node based on the bandwidth allocations.

23. The method of claim 22, wherein the bandwidth management further comprises using a decision tree having one or more rules for determining the allocation of the bandwidth for each service node.

24. The method of claim 23, wherein the bandwidth allocation rules further comprise, for each service node, if no customer is using a particular customer service, then degrading the bandwidth allocated to that customer service.

25. The method of claim 21, wherein the bandwidth allocation comprises one or more of permanent bandwidth allocation, period of time bandwidth allocation and as available bandwidth allocation.

26. The method of claim 25, wherein the bandwidth allocation to each customer service further comprises a maximum bitrate and an average bitrate.

27. The method of claim 21, wherein generating the multiplexes further comprises dropping a customer service provider from the multiplex for a particular service node.

28. The method of claim 27, wherein the dropping further comprises using a ring buffer for adding the dropped customer service back into the multiplex with minimum latency.

29. The method of claim 28, wherein the ring buffer further comprises generating a loop of MPEG group of pictures containing at least one I-frame so that the customer service is reintroduced into the multiplex with minimal latency.

30. The method of claim 22, wherein the bandwidth management further comprises assigning a quality of service to one or more of the customer services based on the bandwidth requests from the customer service providers.

31. The method of claim 30, wherein the quality of service assignment further comprises allocating a minimum guaranteed bandwidth for a particular customer service.

32. The method of claim 30, wherein the quality of service assignment further comprises allocating minimum bandwidths simultaneously to multiple customer services.

33. The method of claim 30, wherein the quality of service assignment further comprises assigning a variable minimum bandwidth to one or more customer services.

34. The method of claim 33, wherein the variable minimum bandwidth comprises one or more of a time of day adjustable bandwidth allocation and a usage level adjustable bandwidth allocation.

35. The method of claim 30, wherein the quality of service assignment further comprises assigning a quality of service to customer services that have been degraded or eliminated from a multiplex.

36. The method of claim 35, wherein the quality of service assignment further comprises maintaining a loop of data in a ring buffer to be able to reinsert the degraded or eliminated customer service with minimal latency.

37. The method of claim 35, wherein the quality of service assignment further comprises maintaining at least an I-frame in an I-frame carousel to restart the customer service with minimal latency.

38. The method of claim 22, wherein generating the multiplexes further comprises assigning a program mapping table to each consumer premises equipment.

39. A dynamic bandwidth allocation device, comprising:
   a dynamic bandwidth allocator that allocates the bandwidth of a system between a plurality of different customer service providers to a plurality of service nodes wherein the bandwidth assigned to each customer service provider for each service node is dynamically adjustable based at least in part on the usage of the services by the customers and the bandwidth requests of each service providers;
   the dynamic bandwidth allocator further comprising a bandwidth manager that receives bandwidth requests from the service nodes and assigns bandwidth to each of the customer service providers based upon the bandwidth requests from the service nodes and a remultiplexer module, based on the bandwidth allocation decisions of the bandwidth manager, that generates the digital data multiplex for each service node based on the bandwidth allocations.

40. The device of claim 39, wherein the customer services comprise one or more of video on demand, IP data and broadcast data.

41. The device of claim 39, wherein the bandwidth manager further comprises a decision tree having one or more rules for determining the allocation of the bandwidth for each service node.

42. The device of claim 41, wherein the bandwidth allocation rules further comprise, for each service node, if no customer is using a particular customer service, then degrading the bandwidth allocated to that customer service.

43. The device of claim 39, wherein the bandwidth allocation comprises one or more of permanent bandwidth allocation, period of time bandwidth allocation and as available bandwidth allocation.

44. The device of claim 43, wherein the bandwidth allocation to each customer service further comprises a maximum bitrate and an average bitrate.

45. The device of claim 39, wherein the remultiplexer further comprises means for dropping a customer service provider from the multiplex for a particular service node.

46. The device of claim 45, wherein the dropping means further comprises a ring buffer for adding the dropped customer service back into the multiplex with minimum latency.

47. The device of claim 46, wherein the ring buffer further comprises an MPEG group of pictures containing at least one I-frame so that the customer service is reintroduced into the multiplex with minimal latency.

48. The device of claim 39, wherein the bandwidth manager further comprises means for assigning a quality of service to one or more of the customer services based on the bandwidth requests from the customer service providers.

49. The device of claim 48, wherein the quality of service assigner further comprises means for allocating a minimum guaranteed bandwidth for a particular customer service.

50. The device of claim 48, wherein the quality of service assigner further comprises means for allocating minimum bandwidths simultaneously to multiple customer services.

51. The device of claim 48, wherein the quality of service assigner further comprises means for assigning a variable minimum bandwidth to one or more customer services.

52. The device of claim 51, wherein the variable minimum bandwidth comprises one or more of a time of day adjustable bandwidth allocation and a usage level adjustable bandwidth allocation.

53. The device of claim 48, wherein the quality of service assigner further comprises means for assigning a quality of service to customer services that have been degraded or eliminated from a multiplex.

54. The device of claim 53, wherein the quality of service assigner further comprises a ring buffer for maintaining a continuous loop of data to be able to reinsert the degraded or eliminated customer service with minimal latency.

55. The device of claim 53, wherein the quality of service assigner further comprises a I-frame carousel for maintaining at least an I-frame of the data of the customer service to restart the customer service with minimal latency.

56. The device of claim 39, wherein the remultiplexer further comprises means for assigning a program mapping table to each consumer premises equipment.

\* \* \* \* \*